Jan. 16, 1923.
F. H. PETERSEN.
TOOL HOLDER.
FILED JAN. 19, 1921.
1,442,234.
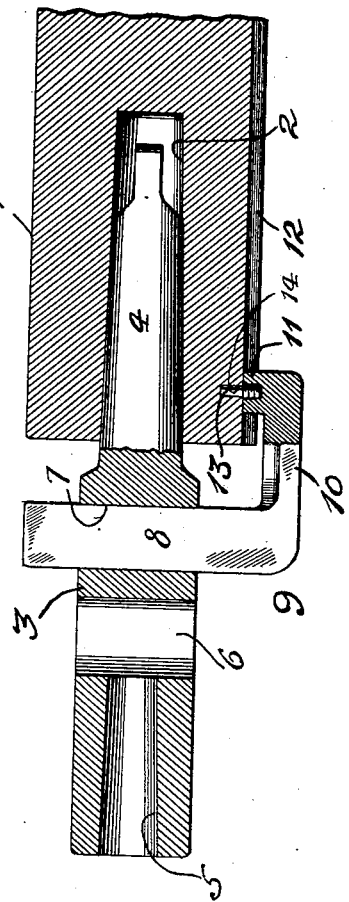
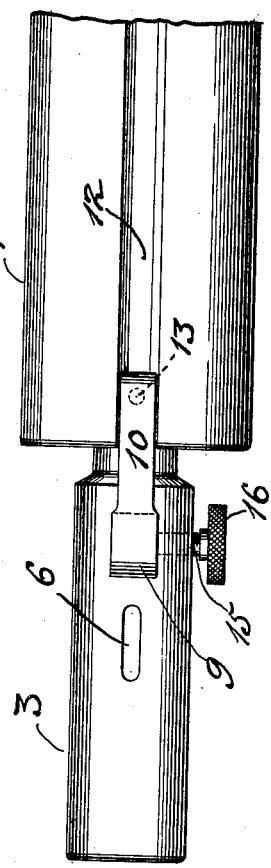
Frank H. Petersen
INVENTOR.
BY
Mason Fenwick & Lawrence,
ATTORNEYS Patented Jan. 16, 1923.

1,442,234

UNITED STATES PATENT OFFICE.

FRANK H. PETERSEN, OF DENVER, COLORADO. ASSIGNOR, BY MESNE ASSIGNMENTS, OF ONE-HALF TO A. L. WESTON, OF DENVER, COLORADO.

TOOL HOLDER.

Application filed January 19, 1921. Serial No. 438,406.

*To all whom it may concern:*

Be it known that I, FRANK H. PETERSEN, a citizen of the United States, residing at Denver, in the county of Denver and State of Colorado, have invented certain new and useful Improvements in Tool Holders; and I do hereby declare the following to be a full, clear, and exact description of the invention, such as will enable others skilled in the art to which it appertains to make and use the same.

This invention relates to tool holders and is particularly designed for holding drills, reamers, taps, etc., in the tail spindle of an engine lathe or the like.

The object of the invention is to permit holding a tool holder in the socket of the tail spindle of a lathe after the tail center has been removed in such manner as to prevent the tool holder from marring the said socket to the detriment of the accuracy of the lathe.

The invention consists in a novel tool holder having a shank adapted to be inserted in the usual taper socket of a tail stock spindle; in a novel dog adapted to engage said tool holder and the tail stock spindle so as to prevent torsional movement of the tool holder, and in the combination of a novel tool holder and a special dog adapted to engage said tool holder when seated in the tail spindle and prevent it from rotating or moving longitudinally with respect to said spindle.

In the accompanying drawings, in which corresponding reference characters designate corresponding parts:

Figure 1 is a vertical longitudinal section through a conventional tail socket spindle and through an improved tool holder held therein and prevented from turning with respect thereto by an improved dog;

Figure 2 is an elevation of said parts viewed from beneath.

In the said drawings, 1 indicates a conventional tail stock spindle of an engine lathe provided at its end with a socket 2, of a Morse or other standard taper, adapted normally to receive the tail center. In the drawings the tail center has been removed and replaced by a special tool holder 3. This tool holder is provided at one end with a tapered shank 4, of standard taper, fitting snugly in the tapered opening 2 of the tail spindle. The other extremity of the tool holder 3 is provided with a socket 5 which is preferably of standard taper adapted to receive a drill, reamer, tap or the like, provided with a correspondingly tapered shank. Said socket 5 terminates in a transverse drift hole 6, as is usual in tool holders for holding taper shank tools having a tang end.

In the body of the tool holder 3, between the drift opening 6 and the tapered shank 4, is a transverse opening 7, preferably rectangular in cross section, said opening 7 being adapted and intended to receive the body 8 of a special dog 9. The dog 9 is provided with a tail 10 extending substantially at right angles from one end of the body 8 and the extremity of the said tail 10 terminates in a key or feather 11 adapted to engage in the usual keyway 12 formed in the under side of the tail spindle 1. Projecting from the inner face of the key or feather 11, and preferably having a threaded connection therewith as in the embodiment shown, is a stud 13 adapted to be seated in a socket 14, corresponding in size and depth to said stud 13, said socket being formed in the spindle 1 from the bottom of the keyway 12. In order to adjustably secure the dog 9 to the tool holder 3, and retain the key or feather 11 in engagement with the keyway 12 and the stud 13 in engagement with the socket 14, a threaded hole is formed in the body 3, said hole extending from the exterior of said body into the opening 7. In this threaded hole is fitted a threaded thumb screw 15 having a knurled head 16 adapted to be seized by the thumb and fingers for securing the properly adjusted dog to the body 3.

By the described construction the shank 4 of the tool holder 3 may be fitted into the tapered seat of the spindle 1, from which the tail center has been removed; the body 8 of the dog 9 inserted and properly adjusted in the transverse opening 7; the key or feather 11 and the stud 13 seated in the keyway 12 and socket 14, respectively, of the spindle 1, whereafter the screw 15 may be tightened on the body 8. When the parts have been so fitted the tool holder 3 cannot be twisted in the socket 2 nor can it be withdrawn endwise.

Although a tool or tool holder having a standard tapered shank properly fitted to a standard tapered socket is so securely held that it cannot turn in the socket, yet sometimes such tools and tool holders have particles of solid matter or oil adhering to them and are inadvertently fitted into the socket without removing the foreign matter. In the event of imperfect fitting the tool or tool holder may jump under torsional strains and thus mar the socket, a contingency that is to be particularly guarded against in using a tool in the tail-center socket of an engine lathe, as the marring or distortion of the socket injuriously affects the precision of the lathe. Furthermore, drills and the like tend to feed themselves forward when cutting and will sometimes loosen in the socket unless the feed of the work, or drill holding spindle, is at least equal to or greater than the self-feeding movement of the tool. Both of the said movements are absolutely prevented by the use of the improved tool holder and dog. The engagement of the dog with the tool holder and the engagement of the tail of the dog with the spindle in the manner shown prevents both torsional and endwise movement of the said tool or holder.

The improved construction described provides for fitting a tool holder to any size of tail stock spindle as the dog may be adjusted in the opening 7 so as to bring the key 11 and stud 13 into engagement with the exterior of any standard lathe spindle. The dog itself being adjustable through said opening 7, avoids the necessity of weakening the holding dog by the use of separate adjustable parts.

Having described my invention in such manner as to enable those skilled in the art to which it appertains to make and use the same, what I claim and desire to secure by Letters Patent is:

1. In apparatus of the class described, the combination with a spindle, means for centering a member thereto, a member centered on the spindle and having a transverse hole in its body in advance of the spindle end, and means for preventing relative rotation between said member and spindle said means comprising a dog having a body fitting in said transverse hole.

2. In apparatus of the class described, the combination with a spindle having a socket in its end, of a tool holder having at one end a shank adapted to fit said socket, and a tool holding socket at the other end, said tool holder having a transverse opening through its body, and a dog adjustable in said opening, said dog having a tail member adapted to engage the spindle so as to prevent relative rotary motion between said tool holder and said spindle.

3. In apparatus of the class described, the combination with a spindle having a socket, of a tool holder having at one end a shank corresponding to said socket, and at the opposite end a tool holding socket, said tool holder having a transverse opening therethrough, a dog adjustable in said opening, said dog having a tail extending from the body at an angle thereto, said tail being provided with a stud projecting substantially parallel with the body, and said spindle having a socket adapted to receive the stud on the tail of said dog.

4. In apparatus of the class described, the combination with a tool spindle having a socket, of a tool holder having at one end a shank adapted to fit said socket and at the other end a socket adapted to receive a tool, said tool holder having a transverse opening therethrough, a dog seated adjustably in said opening and having a tail adapted to engage the spindle and a clamp screw threaded in said tool holder for securing the dog adjustably in place.

5. In apparatus of the class described, a tool holder having at one end a shank adapted to be seated in the socket of a tail spindle, and at the other end a socket adapted to receive a tool, said tool holder having a transverse opening therethrough between the shank and tool socket adapted to receive a dog for the purpose of preventing rotary movement of the tool holder in the socket.

6. In apparatus of the class described, a dog having a substantially straight, parallel sided, bar-like body and a rigid tail portion extending substantially at right angles therefrom, said tail portion terminating in a key or feather on its inner edge adapted to engage the keyway of the tail spindle of a lathe.

7. In apparatus of the class described, a dog having a substantially straight, parallel sided, bar-like body and a rigid tail member extending substantially at right angles therefrom, said tail member having a stud projecting in a direction substantially parallel with the body, and adapted to be inserted in a socket formed in the tail spindle of a lathe.

8. In apparatus of the class described, a dog having a substantially straight, parallel sided, bar-like body adapted to engage an opening in a tool holder, and a rigid tail piece extending substantially at right angles therefrom, said tail piece terminating in a key or feather on its inner edge adapted to engage the keyway of the tail spindle of a lathe, and a stud projecting from the face of the feather in a direction substantially parallel to the body of the dog, said stud being adapted to engage a socket in the tail spindle.

In testimony whereof I affix my signature.

FRANK H. PETERSEN.